March 31, 1959  G. B. VAN NESS  2,879,540
POULTRY SCALDING APPARATUS AND PROCESS
Filed Jan. 17, 1957  4 Sheets-Sheet 1
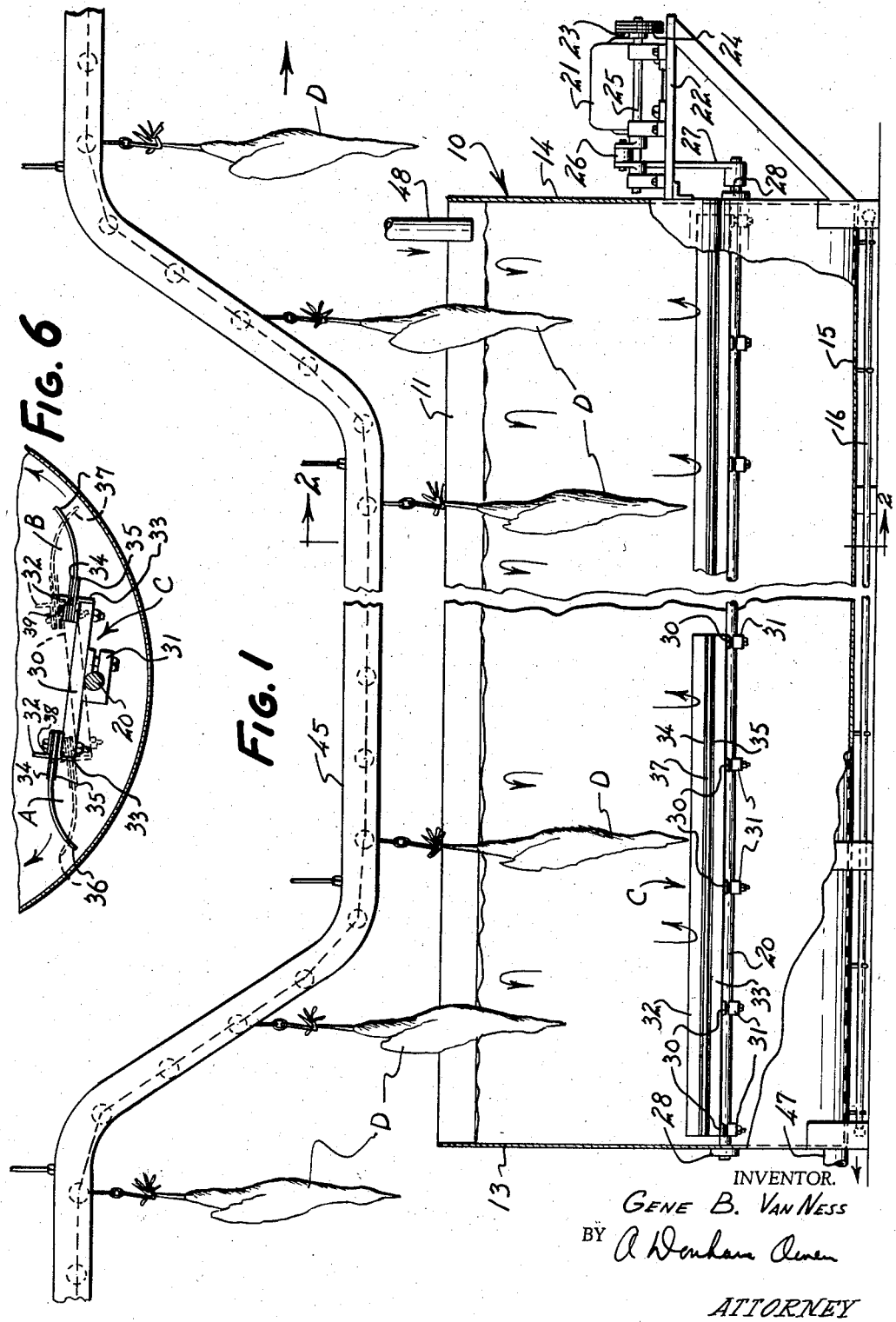
INVENTOR.
GENE B. VAN NESS
BY
ATTORNEY March 31, 1959  G. B. VAN NESS  2,879,540
POULTRY SCALDING APPARATUS AND PROCESS
Filed Jan. 17, 1957  4 Sheets-Sheet 2

INVENTOR.
GENE B. VAN NESS
BY
ATTORNEY

March 31, 1959 G. B. VAN NESS 2,879,540
POULTRY SCALDING APPARATUS AND PROCESS
Filed Jan. 17, 1957 4 Sheets-Sheet 3

INVENTOR.
BY GENE B. VAN NESS
ATTORNEY

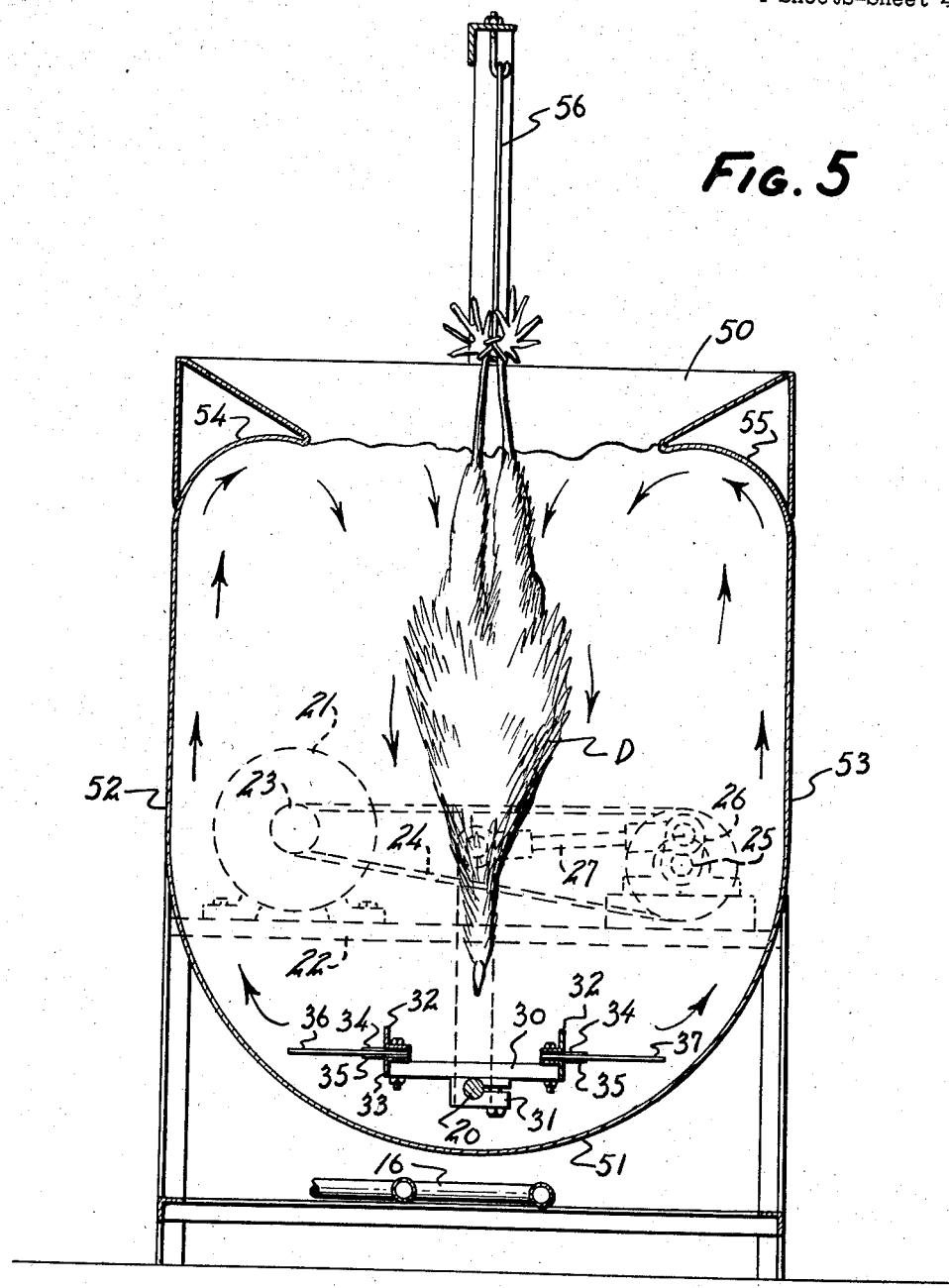

United States Patent Office 2,879,540
Patented Mar. 31, 1959

2,879,540

POULTRY SCALDING APPARATUS AND PROCESS

Gene B. Van Ness, Castro Valley, Calif.

Application January 17, 1957, Serial No. 634,676

14 Claims. (Cl. 17—11.2)

This invention relates to a new process and to new apparatus for facilitating the removal of feathers from poultry. In particular, it relates to improvements in scalding operations and poultry immersion equipment, whereby freshly killed fowl are subjected to an agitated hot water bath to loosen the feathers so that they may be readily removed in subsequent plucking operations.

Many modern poultry processing plants operate on a production line basis in order to keep up with constant large scale demands for dressed and processed poultry. In a typical plant of the production line type, an overhead chain conveyer system is used to carry the poultry, such as chickens or turkeys or ducks, etc., through the various stages of processing. The stages may include: suspending the poultry, head down, from an overhead conveyor; killing the poultry; loosening the feathers in a scalding bath; removing the bulk of the loosened feathers, as with rotary, rubber fingered beaters; manually removing the residual feathers; singeing the defeathered carcasses to burn off the remaining fine hairs; and finally removing the carcass from the overhead conveyor for packaging or further processing, such as evisceration or quick freezing.

In smaller plants, similar operations may be used to carry out the same basic operation on a batch basis instead of using a conveyor chain.

In both types of plants, there have been troubles in the scalding operation. Excessive amounts of water have been used in vats occupying an over-large proportion of the plant, and even then a satisfactory loosening of the feathers has not always been obtained.

The importance of the scalding operation rests in the fact that when hot water at the proper temperature is once brought into contact with the skin of the poultry, the muscles in the skin loosen their grip on the feathers, so that the feathers can easily be plucked out. In fact, without scalding, mechanical plucking is out of the question. The problem is, that the necessary water contact is not easily accomplished, since the body of the fowl is protected by a cushioning layer of oily feathers and entrapped air, both of which tend to resist water penetration. Moreover, since the temperature required for the desired effect lies in a very narrow range, water sufficiently hot to insure easy plucking tends to discolor the carcass when it is exposed to air. Therefore, it is desirable to use a lower temperature bath, get the fowl into the bath as soon as possible after bleeding, and keep the fowl submerged for as short a time as possible in order to avoid extensive stiffening of the muscles or advanced rigor mortis, which seriously retards plucking.

Heretofore, commercial equipment has relied principally on systems that pour water over the fowl to hold them submerged. Circulating pumps or paddles are often used to give a rather gross agitation of the hot water bath in an attempt to thoroughly wet the skin around the roots of the feathers in as short a time as possible. Or a basket of the fowl is often rotated in the water. In continuous-operation plants a typical immersion tank is an elongated double walled structure equipped with a large number of small pumps that continuously circulate the hot water from the bottom of the tank to the top through the double walls. However, in the conveyor type of operation, the very movement of the chicken carcass through the bath tends to drag it along the top of the bath, and that is why water is poured down on top of it. Photographs and observation of operations have shown that even then, frequently, the chicken does not get immersed until relatively late in the tank, and even then is not immersed well enough. Therefore, long tanks had to be used, and a lot of water had to be poured in or recirculated through the double walls. As a result, typical double wall scalding tanks have averaged about 80 to 300 cubic feet in volume, and have been 40 feet long or longer. This large tank size has required a great deal of floor space, large water heating capacity, many pumps, and much water, thereby imposing significant maintenance expenses.

An important object of the present invention is to provide a scalding process in which the chicken is sucked down into the water instead of pushed into it by water poured from above.

Another important object of the invention is to provide an apparatus that provides for downward suction throughout the entire length of the scalding tank.

Another object is to subject the sucked-under fowl to intense conflicting currents which act efficiently to lessen the needed immersion time. This contrasts with the use of falling water, in which currents were created only by the speed of the conveyor, the falling water, and the displacement of water by the pumps in the double walls at each side of the tank that lifted the water. Similarly, in basket types of immersion tanks, birds were out of the water a large proportion of the time, because the bottom level of the fowl-carrying basket was above the water level when it was horizontal. In other words, the birds were out of the water probably more than 50% of the time.

Another object of the invention is to provide an apparatus which will make it possible to reduce the immersion time in the scalding of fowls, so that scalding can be completed before rigor mortis advances to the stage where plucking becomes difficult.

Another object of the invention is to make it possible to use shorter and narrower tanks.

Another object of the invention is to reduce the amount of materials and the amount of floor space consumed by the apparatus in the scalding operation. My invention makes it possible to eliminate the double-walled constructions and to use single-walled tanks and simultaneously to gain efficiency over the double-walled tanks heretofore in use.

Another object of the invention is to make possible the provision of a two-way tank in which a tank only about four feet wide can be divided into two divisions by a lateral partition, the fowl being pulled the length of the tank on one side of the partition, then around to the other side and back on that side.

Another object of the invention is to bring about substantial savings in water, heat, space and materials, along with greater efficiency in the scalding operation of dressed fowls.

In general, my invention comprises a novel scalding tank which operates according to a new method. The tank of my invention is provided with a pair of submerged relatively stiff diaphragm plates positioned in certain locations above the bottom of the tank. The diaphragm plates are preferably spaced from deflectors, which extend the length of the tank below and to the side of the diaphragms and may form a part of the side walls of the tank. There may also be other deflectors at the top of the tank. In operation, the diaphragms near the bottom of the tank are vibrated rapidly. The result is that a substantial movement of water out (and in toward) flows from each diaphragm. This movement provides a pair of circulating currents passing over a path out toward the side walls, up them, and in at the top and then down vertically to the bottom of the tank. These currents of water meet the chickens and pull them down in the water. The vacuum created by the diaphragms forcing out water thus provides a source of suction which pulls the water down vertically at about the center of the tank where the poultry is immersed, and therefore pulls the poultry down into the hot water. The circulating current of water, which goes from the bottom of the tank out to the sides, up the sides, over to the middle at the top and then straight down provides a powerful force that holds the chicken down and gets full value from the immersion bath. Moreover, the directed flow aids in penetrating the entraining air and the feathers of the chicken itself and in getting very efficient contact with the skin.

Other objects and advantages of the invention will appear from the following description of a preferred embodiment thereof, presented in accordance with the statute.

In the drawings:

Fig. 1 is a view in side elevation and in section of a poultry immersion tank embodying the principles of the present invention as applied to the conveyor type of operation with fowl shown suspended from a conveyor, the tank and conveyor being broken in the middle to conserve space.

Fig. 5 is a view of a modified form of tank which may be used in batch operations.

Fig. 6 is a view of the bottom portion of the tank of Fig. 5, showing the diaphragms in operation.

Figure 3:
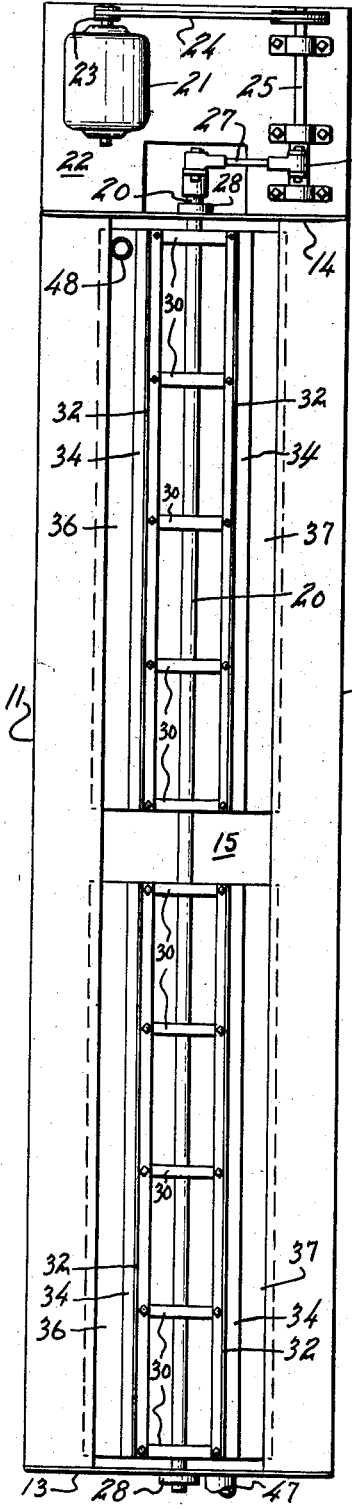
Fig. 3 is a top plan view of the tank of Fig. 1, on the scale of Fig. 2.
Figure 2:
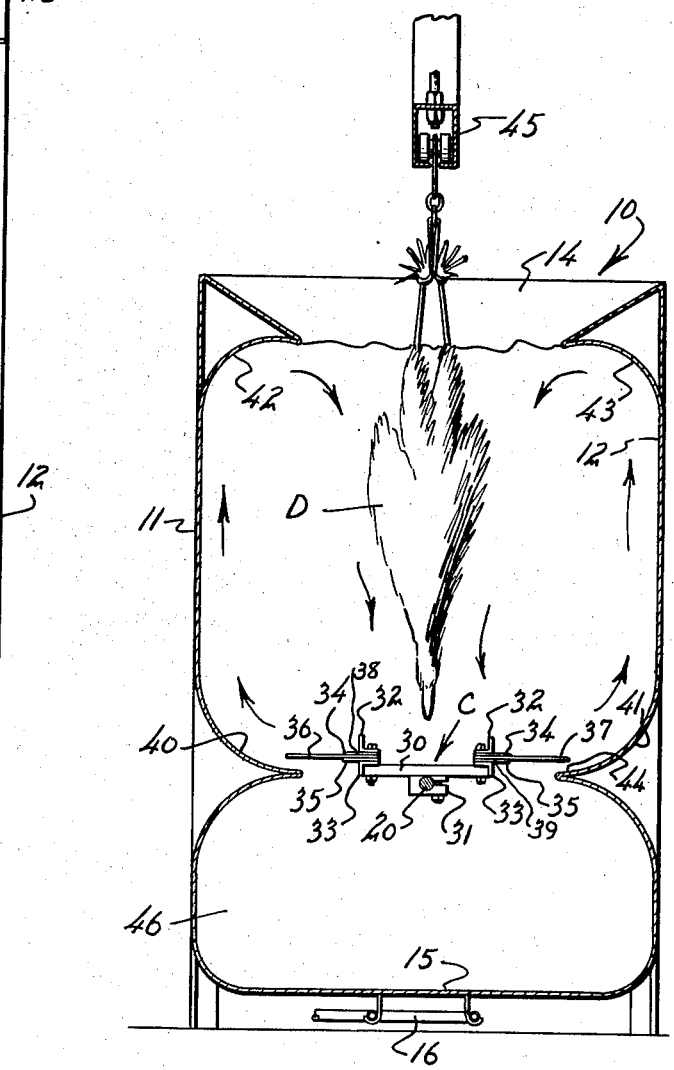
Fig. 2 is a view in vertical section taken along the line 2—2 in Fig. 1, shown on a reduced scale.

The tank 10 shown in Figs. 1–3 has vertical side walls 11 and 12 and vertical end walls 13 and 14. Below its bottom wall 15 (or, in some instances, above it and inside the tank 10) there may be a heating apparatus 16, such as a gas burner (if below the wall 15), steam-circulating pipes, or other heater.

Extending along the longitudinal axis of the tank 10, that is, between the end walls 13 and 14, at a suitable height above the bottom wall 15, is a rocking shaft 20, which may be rocked by any means that will provide a desired amplitude at a desired frequency, as explained below. For example, a motor 21 supported on a bracket 22 outside one tank end wall 14, may drive a shaft 23, and the shaft 23 may drive a belt 24, which, in turn, drives a crankshaft 25 having a single eccentric or crankpin 26. A rocker arm 27 may connect the eccentric 26 to the shaft 20. It is evident that rotation of the motor 21 will then result in rocking the shaft 20 at a frequency equal to the angular speed of the motor 21 and at an amplitude determined by the eccentricity of the pin 26 and the length of the arm 27. This example is, of course, not restrictive. Any of many well-known types of shaft-rocking devices may be used to rotate the shaft 20 back and forth in its bearings 27, which are set in the end walls 13 and 14 of the tank 10.

The shaft 20 extends along the longitudinal axial plane of the tank 10 and in the lower portion thereof. A series of transverse supporting bars 30 are secured generally horizontally to the shaft 20, as by integral screw clamps 31 or U-bolts (not shown). To each end of the bars 30 are preferably secured a series of pairs of angle irons 32, 33, or similar strong longitudinally extending strip supporting members. Between each pair of angle irons 32, 33 may be bolted a pair of flexible steel strips 34, 35, holding between them a flexible steel diaphragm member 36 or 37, that projects out toward one of the side walls 11 or 12. The diaphragms 36, 37 may comprise 20-gauge spring steel or other suitable material; the strips 34, 35 reinforce the diaphragms 36, 37 and may be 20-gauge or lighter, or beveled diaphragms may be used.

The diaphragms 36, 37 are vibrated by the rocking of the shaft 20, the amplitude preferably lying between about one-quarter inch and one inch, at the rigid base portions 38, 39 (in line with the outer edge of the angle irons 32, 33), depending upon the frequency of the cycle. Thus at a cycle of 1750 r.p.m. an amplitude of one-quarter inch is sufficient. At 1425 r.p.m. an amplitude of five-sixteenths inch has given excellent results. At an amplitude of 875 r.p.m. an amplitude of seven-sixteenths of an inch has been successful. Between 200 r.p.m. at 1 inch and 2000 r.p.m. at ¼ inch are usable. As shown in Fig. 6, the vibration of the diaphragms 36, 37 is damped by the action of the water so as to provide a lagging of portions of the diaphragms 36, 37. This action also causes the ejection of water from the areas A and B swept by the diaphragms 36, 37. Thus, the diaphragms 36, 37 move water from the center of the tank out toward its side walls.

The tank 10 is provided with deflecting wall portions 40, 41 that curve out and up away from the respective diaphragms 36, 37, so that the water moved out from the areas A and B has no place to go but up. It flows up along the side walls 11 and 12, as shown in Fig. 2, to upper deflector plates 42, 43, whence it is turned in toward the center of the tank 10.

The movement of water away from the central portion of the lower portion of the tank 10 toward the sides during the downstroke of a diaphragm 36 produces a force of suction when the diaphragm 36 moves in the opposite direction, and water is then sucked into this space C from in between the two diaphragms 36, 37. A similar movement happens in the movement of the diaphragm 37, except that the water is moved toward the side wall 12 instead of toward the wall 11. This downward and outward flow of water cooperates, of course, with the central and downward flow of the expelled water coming in from the upper deflectors 42, 43. As a result, a pair of circulatory systems send water in from each side of a chicken D and these systems push the chicken D directly down under the water with great force. The downward movement of the suction force also impels the water against the chicken itself, and into the feathers and into contact with the skin. The chicken may be caught in the upward flow and rolled and tossed, to good advantage.

The movement of the hot water is continuous and extends over the complete length of the tank. Thus, as soon as a chicken D is moved by the conveyor 45 into the tank 10 just past the end wall 13, it is sucked under and subjected to intense conflicting currents that both aid in penetration of the feathers by water and in holding the chicken under the water. Therefore, the necessary immersion time is short, relative to that in prior-art devices.

Below the bottom deflectors 40, 41 is a setting sump 46, whence dirt, dried blood, fecal matter, and other solid defiling matter can settle and be carried away by a waste pipe 47, while clean water may be supplied by an inlet pipe 48 near the top of the tank 10. This construction aids in maintaining continuous operation, because there are laws prescribing the amount of water that must be used. The sump 46 is relatively quiet, the circulation taking place predominantly in the tank above the deflectors 40, 41. Waste and foam may be skimmed from the top, if desired.

The length of the tank 10 and the speed of the conveyor chain 45 are governed by the proper scalding time for the chicken, and the better contact and more powerful wetting action of my device speeds up the scalding operation, so that the time may be substantially reduced over prior-art equipment. Therefore, the tanks 10 may be made much smaller and less water needs to be heated.

Since suction flow of this invention is achieved with a very small amplitude of vibration at a relatively large frequency, the water is constantly recirculated. Because of this phenomenon, the operation is well suited to an inexpensive batch-type of scalding operation for small poultry plants which could not afford the large tanks or the large amounts of water that have to be used by very large tanks. They can, however, afford a tank 50 of my invention, shown in Figs. 5 and 6, which can still achieve the rapid and trustworthy type of water circulation that enables precise timing of the proper scalding time at the proper temperature.

The tank 50 differs from the tank 10 in having no sump 46 or continuous withdrawal of water, and in not having a moving chain 45. The diaphragms 36, 37 may be identical, as may be their vibration mechanism. Instead of the lower deflectors 40, 41, the tank 50 has a curved bottom wall 51 which flows smoothly into side walls 52 and 53. Again, upper deflectors 54, 55 are preferably supplied. The water will follow the same path without them, but operation is superior with them. The chickens D may be suspended by rope 56, wire, or baskets if desired, and again will be pulled under water as in the case of the continuous-type tank 10.

Operation of the tanks 10 and 50 is thus substantially identical. The rapid vibration of the diaphragms 36, 37 forces water out from the center line of the tank toward the side walls, whence it is deflected up against the side walls. At the top of the tank, the water flows in to the center and then it moves down vertically to the diaphragms. The powerful currents hold the chickens D down and subject them to intense conflicting currents that reach the skin and warm it up, relaxing the muscles, so that the feathers are easily plucked.

Figure 7:
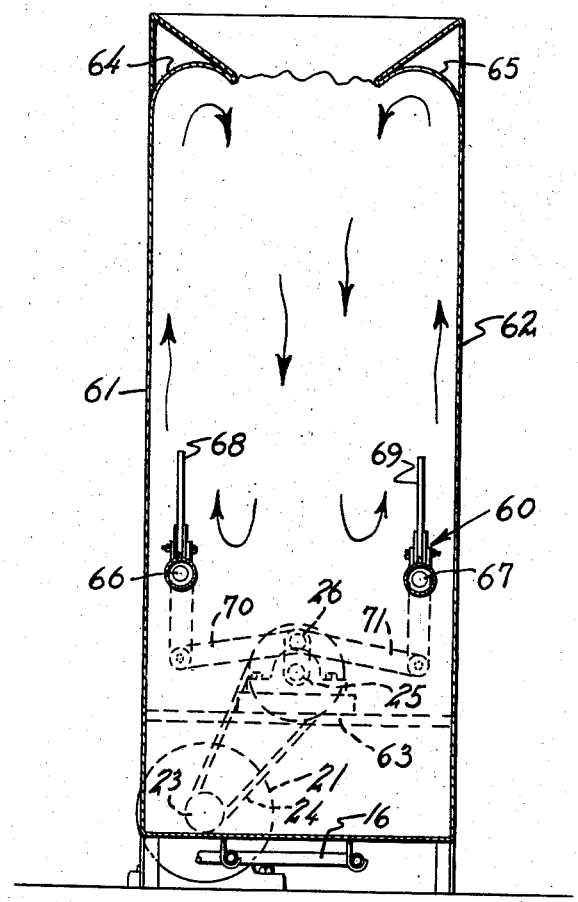
Fig. 7 is a view similar to Fig. 5, of another modified form of the invention.
Figure 4:
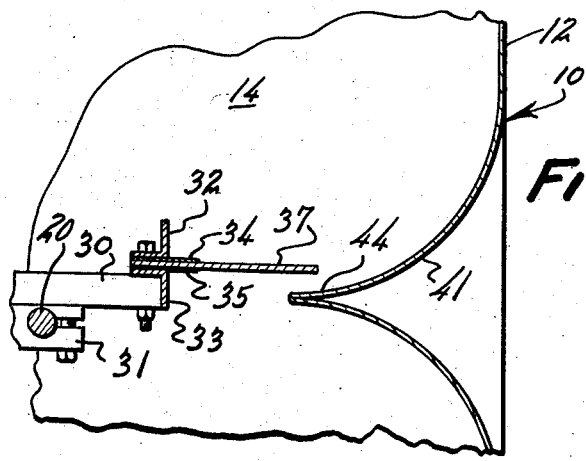
Fig. 4 is an enlarged detail view in elevation and in section of a portion of Fig. 2.

Another modification is shown in Fig. 7. Here is a tank 60 with vertical side walls 61 and 62 and bottom wall 63. Deflecting means 64 and 65 are preferably provided at the top edge of each side wall 61 and 62. The principal modification in this form of the invention is the provision of a pair of shafts 66 and 67 with vertically disposed diaphragms 68 and 69 secured thereto by any desired means in a vertical position closely adjacent the respective side walls 61 and 62. Suitable eccentric means 70, 71 are provided for rocking both shafts 66 and 67 so as to vibrate the diaphragms 68 and 69. The operation is substantially identical to that already discussed, except that the diaphragms 68 and 69 are in a different location. In this instance, the water expelled from the free edge of the diaphragm moves upwardly toward the deflecting means 64 and 65 where it is turned inwardly toward the center. The water then passes down the center of the tank toward the bottom of it and the suction caused by the expelling of the water from the diaphragms, 68 and 69, draws water in from below the diaphragms, causing movement from the center of the tank out toward the sides. Thus, substantially the same flow of water occurs although the diaphragms are positioned in different locations. In other words, the method of the application remains the same and the circulation of the water remains the same, but instead of having horizontal diaphragms 36, 37 disposed on each side of the center with a space between them to permit water to pass in, the diaphragms 68, 69 are spaced at the side and are set vertically. In other words, the diaphragms are set at a different location in the same circulatory path, but they perform substantially the same function and get substantially the same results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A scalding tank for poultry, comprising a tank adapted to hold hot water, having a bottom wall, end walls, and side walls, and an open top from which the poultry are immersed in the tank, said tank having a longitudinal axis; a pair of generally rectangular stiff diaphragms parallel to and on opposite sides of the longitudinal axis of the tank providing a pair of horizontally extending longitudinal edges, said diaphragms being spaced above said bottom wall and away from said side walls and supported only along one said horizontaly extending longitudinal edge; and means operatively connected to the supported edge of each diaphragm for vibrating said diaphragms rapidly so as to force water outwardly from them, so that the water in the tank has a pair of currents flowing in a circle toward said side walls, vertically up them, inwardly at the top of the tank to the center of said tank, and downwardly thereat.

2. The tank of claim 1 wherein said diaphragms are vibrated at a frequency between about 200 cycles per minute and 2000 cycles per minute.

3. The tank of claim 1 wherein the amplitude of vibration of the rigid inner portion of said diaphragms lies between ¼" and 1".

4. The tank of claim 1 wherein the diaphragms are horizontally disposed and extend out toward the side walls of the tank, with their supported edges facing each other and spaced apart on opposite sides of said axis.

5. The tank of claim 4, wherein the side walls of the tank are provided with portions that converge at least part of the way toward said axis a short distance below said diaphragms.

6. The tank of claim 4 wherein said side walls slope smoothly into said bottom wall, forming a curved wall that aids in deflecting the outwardly moving water toward a vertically upward direction.

7. The tank of claim 1 wherein said diaphragms extend vertically, their lower edges being the supported ones, closely adjacent said side walls.

8. A scalding tank for poultry, comprising a tank adapted to hold hot water, having a bottom wall, end walls, and side walls, and an open top from which the poultry are immersed in the tank, said tank having a longitudinal axis; a pair of generally rectangular metal diaphragms parallel to and on opposite sides of the longitudinal axis of the tank, extending generally horizontally toward said side walls, and spaced above said bottom wall and away from said side walls; means operatively connected to said diaphragms for vibrating them rapidly so as to force water outwardly from them; first deflecting means along the upper edge of said side walls, to deflect the water moving upwardly along said side walls, whence it flows inwardly to the center of said tank, whence it moves downwardly and to said diaphragms to replace the outwardly-moving water; and second deflecting means along said side walls extending inwardly and below the level of said diaphragms.

9. The tank of claim 8 wherein said second deflecting means comprise curved portions projecting out from said side walls.

10. The tank of claim 8 wherein said second deflecting means comprise curved wall portions forming said side and bottom walls.

11. A scalding tank for poultry, comprising a tank adapted to hold hot water, having a bottom wall, end walls, and side walls, and an open top from which the poultry are immersed in the tank, said tank having a longitudinal axis; a rotatable shaft in said tank along the longitudinal axis thereof; a pair of generally rectangular planar metal diaphragms supported by said shaft at a spaced distance therefrom parallel to and on opposite sides of the longitudinal axis of the tank and spaced above said bottom wall and extending out generally horizontally toward but spaced away from said side walls; rocking means connected to said shaft so as to vibrate said diaphragms rapidly so as to force water outwardly from them toward said side walls; deflecting means along said side walls below the level of said diaphragms to deflect the outwardly-moving water upwardly against said side walls, whence it flows vertically upwardly and then, at the top of the tank flows inwardly to the center of said tank, whence it moves downwardly to said diaphragms to replace the outwardly-moving water.

12. The tank of claim 11, having additional deflecting means adjacent the top of said side walls to aid in deflecting inwardly the vertically upwardly moving water.

13. A scalding tank for poultry, comprising a tank containing hot water and having a bottom wall, end walls, and side walls, and an open top from which the poultry may be immersed in the tank, said tank having a longitudinal axis; a shaft extending between the end walls along the longitudinal axis of the tank and spaced above said bottom wall; a plurality of transverse support means secured generally horizontally and transverse to said shaft; a pair of lengthwise support means held parallel to and spaced from said shaft by said transverse support means; a pair of generally rectangular metal diaphragms having an inner end supported by said lengthwise support means and extending out therefrom generally horizontally and toward said side walls; rocking means operatively connected to said shaft for oscillating it rapidly so as to vibrate said diaphragms so that they force water outwardly toward said side walls; and means positioned above said tank along the longitudinal axis thereof for suspending poultry in said tank generally along said longitudinal axis where said downwardly-moving water forces the poultry down into the water with great force.

14. A scalding tank for poultry, comprising a tank containing hot water and having a bottom wall, end walls, and side walls, and an open top from which the poultry may be immersed in the tank, said tank having a longitudinal axis; a shaft extending between the end walls along the longitudinal axis of the tank and spaced above said bottom wall; a plurality of transverse support means secured generally horizontally and transverse to said shaft; a pair of lengthwise support means held parallel to and spaced from said shaft by said transverse support means; a pair of generally rectangular metal diaphragms with the inner end supported by said lengthwise support means and extending out therefrom generally horizontally and toward said side walls; rocking means for oscillating said shaft rapidly so as to vibrate said diaphragms so that they force water outwardly toward said side walls; deflecting means extending downwardly and inwardly from said side walls to a point below the level of said diaphragms, for deflecting the outwardly-moving water upwardly against said side walls, whence it flows vertically upwardly; deflecting means along the upper end of said side walls for deflecting upwardly-flowing water inwardly toward the center of said tank, whence it moves downwardly to said diaphragms to replace the water moving outwardly therefrom; and means positioned above said tank along the longitudinal axis thereof for suspending poultry in said tank generally along said longitudinal axis where said downwardly-moving water forces the poultry down into the water with great force.

References Cited in the file of this patent

UNITED STATES PATENTS

| | | |
|---|---|---|
| 1,770,565 | Anderson | July 15, 1930 |
| 1,908,033 | Liva | May 9, 1932 |
| 2,215,288 | Hays | Sept. 17, 1940 |
| 2,491,080 | Bilde | Dec. 13, 1949 |